US012775729B2

(12) United States Patent
Magoon et al.

(10) Patent No.: US 12,775,729 B2
(45) Date of Patent: Oct. 27, 2026

(54) SYSTEMS AND METHODS FOR A DATA ECOSYSTEM

(71) Applicant: Truist Bank, Charlotte, NC (US)

(72) Inventors: Scott Howard Magoon, Cary, NC (US); Tufail Ahmed Khan, Raleigh, NC (US); Di Hu, Raleigh, NC (US)

(73) Assignee: TRUIST BANK, Charlotte, NC (US)

( * ) Notice: Subject to any disclaimer, the term of this patent is extended or adjusted under 35 U.S.C. 154(b) by 422 days.

(21) Appl. No.: 18/517,136

(22) Filed: Nov. 22, 2023

(65) Prior Publication Data

US 2025/0165634 A1 May 22, 2025

(51) Int. Cl.
*G06F 21/62* (2013.01)
*G06F 16/215* (2019.01)

(52) U.S. Cl.
CPC ........ *G06F 21/6218* (2013.01); *G06F 16/215* (2019.01); *G06F 2221/2113* (2013.01); *G06F 2221/2141* (2013.01)

(58) Field of Classification Search
CPC ............................ G06F 21/6218; G06F 16/215
See application file for complete search history.

(56) References Cited

U.S. PATENT DOCUMENTS 6,489,968 B1 12/2002 Ortega
7,512,612 B1 3/2009 Akella
8,041,082 B1 10/2011 Baluja
8,156,115 B1 4/2012 Erol
8,489,627 B1 7/2013 Brandt
8,527,496 B2 9/2013 Wable
8,732,101 B1 5/2014 Wilson
9,053,492 B1 6/2015 Stanley
9,609,031 B1 3/2017 Allen
9,830,321 B2 11/2017 Venkataraman
10,127,511 B1 11/2018 Epstein
10,353,686 B1 7/2019 Pasha
10,467,254 B2 11/2019 Kohlmeier
11,093,548 B1 8/2021 Pang
2004/0249809 A1 12/2004 Ramani
2006/0235873 A1 10/2006 Thomas
2008/0091656 A1 4/2008 Charnock
2009/0070299 A1 3/2009 Parikh
(Continued)

*Primary Examiner* — Clayton R Williams
(74) *Attorney, Agent, or Firm* — Michael A. Springs, Esq.; Shumaker, Loop & Kendrick, LLP; Patrick B. Horne

(57) ABSTRACT

Systems and methods are disclosed for creating a governance graph representing data set interconnection. The data set interconnections may be based on common fields, sources, databases, applications, or patterns of usage. For example, the interconnections may be direct connections, where one data set is directly downstream from another data set. Alternatively, the interconnections may be indirect connections based patterns showing the data sets are commonly used together. For example, given data sets “A”, “B”, and “C”, if “B” is directly connected to “A” because it is downstream from “A”, and a particular group of users commonly use “B” and “C” together, “A” may be indirectly related to “C” based on the pattern of usage. In this example, the governance graph is configured to indicate the connection between “A” and “B” is stronger than the connection between “A” and “C”, whilst still showing said connection.

20 Claims, 16 Drawing Sheets

(56) References Cited

U.S. PATENT DOCUMENTS

| | | | |
|---|---|---|---|
| 2009/0089372 | A1 | 4/2009 | Sacco |
| 2009/0157724 | A1 | 6/2009 | De Peuter |
| 2009/0287685 | A1 | 11/2009 | Charnock |
| 2010/0161651 | A1 | 6/2010 | Cras |
| 2010/0306229 | A1 | 12/2010 | Timm |
| 2011/0125735 | A1 | 5/2011 | Petrou |
| 2012/0005631 | A1 | 1/2012 | B'Far |
| 2012/0158633 | A1 | 6/2012 | Eder |
| 2012/0278297 | A1 | 11/2012 | Yin |
| 2012/0290565 | A1 | 11/2012 | Wana |
| 2012/0311034 | A1 | 12/2012 | Goldband |
| 2013/0024456 | A1 | 1/2013 | Goodson |
| 2013/0036177 | A1 | 2/2013 | Leeder |
| 2013/0185300 | A1 | 7/2013 | Kobayashi |
| 2013/0262588 | A1 | 10/2013 | Barak |
| 2013/0268595 | A1 | 10/2013 | Mohan |
| 2014/0046934 | A1 | 2/2014 | Zhou |
| 2014/0114975 | A1 | 4/2014 | Rouat |
| 2014/0324963 | A1 | 10/2014 | Sankar |
| 2015/0220589 | A1 | 8/2015 | Kummer |
| 2015/0319199 | A1 | 11/2015 | Yanashima |
| 2016/0034462 | A1 | 2/2016 | Brewer |
| 2016/0196350 | A1 | 7/2016 | Mau |
| 2016/0378882 | A1 | 12/2016 | Rodriguez |
| 2017/0344553 | A1 | 11/2017 | Evnine |
| 2018/0121414 | A1 | 5/2018 | Nanavati |
| 2018/0137424 | A1 | 5/2018 | Gabaldon Royval |
| 2018/0158100 | A1 | 6/2018 | Barak |
| 2020/0004759 | A1 | 1/2020 | Brebner |
| 2020/0258511 | A1* | 8/2020 | Barkol .................... G06F 40/30 |
| 2021/0342785 | A1 | 11/2021 | Mann |
| 2022/0067273 | A1 | 3/2022 | Shin |
| 2022/0147569 | A1* | 5/2022 | Cooley .................. G06N 20/10 |
| 2023/0344823 | A1 | 10/2023 | Zamora |
| 2023/0351525 | A1 | 11/2023 | Green |
| 2024/0152545 | A1 | 5/2024 | Jebara |

* cited by examiner

1200

SYSTEMS AND METHODS FOR A DATA ECOSYSTEM

FIELD OF THE INVENTION

This invention relates generally to the field of data governance, and more particularly embodiments of the invention relate to systems and methods for creating data governance graphs and implementing them to manage data sets, whether they are user.

BACKGROUND OF THE INVENTION

The Data Governance Institute defines data governance as "a system of decision rights and accountabilities for information-related processes, executed according to agree-upon models which describe who can take what actions with what information, and when, under what circumstances, using what methods" at https://datagovernance.com/defining-datagovernance/. In any organization, as new data sources emerge from various customer touch points, being able to leverage them to create a master customer profile in a unified repository is key towards providing better products and services, and at the same time increasing loyalty, and reducing churn. Organizations would like to leverage the wealth of data created within their enterprise and generated across their network, for operational and commercial use cases. Using this data as part of the digital transformation program enables better customer satisfaction and promotes sales of existing and emerging products through enhanced merchandising of goods and services. This type of initiative requires creating master records using a Master Data Management (MDM) approach. It is the goal of any MDM solution to enable organizations and their partners to both identity and know their customers and products better in order to provide: Better customer service; Make better bespoke decisions for customers; Identify further opportunities for ancillary sales; and Identify customer preferred interactions and touch points.

Machine learning techniques help integrate customer data silos even in the absence of unique Identifiers from various operational systems. Such systems can use probabilistic matching for record linkage, data clustering and classification techniques along with reinforcement learning for automation on scale out platforms to add significant value to how data can be leveraged as an asset. Delivering MDM functionality can be done on a big data scale by various unified data governance platforms. These platforms provide a Spark-based scale out implementation for matching, linking and mastering, with support for pluggable machine learning libraries that will enable end users to master customer, product and additional data domains using a set of consistent processes and methodologies. The model is flexible based on an organization's business requirements and does not require a specific type of data model for the data entities to be mastered. Spark-based machine learning has several advantages over traditional data matching. It matches all types of data domains, it has "live" training that provide unlimited flexibility, and it scales to volumes that weren't previously attainable. The end result is an agile master data management capability.

A key component of MDM is the classification of datasets to enable users to locate stored data relevant to a work task. Various known algorithms have been used in the classification process. Some of the commonly used types of classification algorithms are described below with advantages and disadvantages.

Logistic Regression is a machine learning algorithm for classification. In this algorithm, the probabilities describing the possible outcomes of a single trial are modelled using a logistic function. An advantage of logistic regression is that it designed for classification purposes and is most useful for understanding the influence of several independent variables on a single outcome variable. Disadvantages are that it works only when the predicted variable is binary, assumes all predictors are independent of each other and assumes data is free of missing values.

The Naive Bayes algorithm is based on Bayes' theorem with the assumption of independence between every pair of features. Naive Bayes classifiers work well in many real-world situations such as document classification and spam filtering. Advantages of this algorithm are that it requires a small amount of training data to estimate the necessary parameters. Naive Bayes classifiers are extremely fast compared to more sophisticated methods. A disadvantage is that Naive Bayes is known to be a bad estimator.

Stochastic Gradient Descent is a simple and very efficient approach to fit linear models. It is particularly useful when the number of samples is very large. It supports different loss functions and penalties for classification. Advantages are efficiency and ease of implementation. Disadvantages are that it requires a number of hyper-parameters and it is sensitive to feature scaling.

K-Nearest Neighbors classification is a type of lazy learning as it does not attempt to construct a general internal model, but simply stores instances of the training data. Classification is computed from a simple majority vote of the K nearest neighbors of each point. Advantages are that this algorithm is simple to implement, robust to noisy training data, and effective if training data is large. Disadvantages are the need to determine the value of K and the computation cost is high as it needs to compute the distance of each instance to all the training samples.

Decision Tree-Given a data of attributes together with its classes, a decision tree produces a sequence of rules that can be used to classify the data. Advantages are that it is simple to understand and visualize, requires little data preparation, and can handle both numerical and categorical data. Disadvantages are that it can create complex trees that do not generalize well, and decision trees can be unstable because small variations in the data might result in a completely different tree being generated.

The Random Forest classifier is a meta-estimator that fits a number of decision trees on various sub-samples of datasets and uses average to improve the predictive accuracy of the model and controls over-fitting. The sub-sample size is always the same as the original input sample size but the samples are drawn with replacement. Advantages are a reduction in over-fitting and is more accurate than decision trees in most cases. Disadvantages are slow real time prediction, difficult to implement, and a complex algorithm.

The Support Vector Machine is a representation of the training data as points in space separated into categories by a clear gap that is as wide as possible. New examples are then mapped into that same space and predicted to belong to a category based on which side of the gap they fall. Advantages are effective in high dimensional spaces and uses a subset of training points in the decision function so it is also memory efficient. Disadvantages are that the algorithm does not directly provide probability estimates, these are calculated using an expensive five-fold cross-validation.

The invention described herein provides a dataset classification method that improves the classification accuracy as compared to known dataset classification methods.

Owners and managers of data assets in an organization are required to properly control how data is handled and ensure that certain data governance policies, practices, and processes are in place to manage their data effectively and ensure its quality, security, and compliance. Key components of proper data governance include data ownership, data quality, data security, data privacy, data cataloging, data lifecycle management, data access and permissions, data governance compliance and auditing, data documentation, data stewardship, data governance framework, and data training and awareness. Thus, proper data governance allows organizations to maximize the value of their data assets, minimize risks such as data misuse, and enhance decision-making processes by using the data to better understand the needs of the organization or its customers. Although data or digital assets have inherent traits such as metadata and data fields, without a proper visual or structural representation of the interconnectedness of the data, a data steward may spend unnecessary time and resources trying to understand the data. Thus, a need exists for improved systems and methods for managing and governing digital assets that are streamlined and automated to addresses these shortcomings.

BRIEF SUMMARY

Shortcomings of the prior art are overcome and additional advantages are provided through the provision of systems and methods for implementing representations of digital assets and their connectedness through the use of a data governance graph based on various similarities in the data to improve efficiency, security, and overall data management.

A computer-implemented method for creating a representation of interconnections between data sets includes: (1) receiving a plurality of data sets from a plurality of sources using a computer, the data sets including a plurality of traits; (2) storing the plurality of data sets into a data catalog; (3) determining at least one common trait for a first data set and a second data set from the plurality of data sets; (4) generating a representation of a first interconnection between the first data set and the second data set based on the at least one common trait, wherein the representation of the first interconnection comprises a first value; (5) determining at least one common trait for the second data set and a third data set from the plurality of data sets; (6) generating a representation of a second interconnection between the second data set and the third data set based on the at least one common trait, wherein the representation of the second interconnection comprises a second value; and (7) displaying, via a graphical user interface, a governance graph comprising the first interconnection and the second interconnection.

For the computer-implemented method, at least one of the first interconnection and the second interconnection include at least one of a interconnection between data sets, data policies, data procedures, and data usage patterns.

The method further includes the at least one of the first interconnection being based on data usage patterns.

The method further includes generating and displaying via graphical user interface, a recommendation of one or more additional data sets having at least one common trait with at least one of the first data set, the second data set, and the third data set.

For the interconnection value, the first value represents a stronger connection than the second connection. Likewise, the first value may be indicated by a short line on the displayed governance graph and the second value may be indicated by a long line on the displayed governance graph.

The method further includes determining at least one common trait for the first data set and the third data set from the plurality of data sets, generating a representation of a third interconnection between the first data set and the third data set based on the at least one common trait, wherein the representation of the third interconnection includes a third value, and displaying via the graphical user interface, the governance graph comprising the first interconnection, the second interconnection, and the third interconnection.

The computing system for creating a representation of associations between data sets, the system including at least one processor, a communication interface communicatively coupled to the at least one processor, and a memory device storing executable code that, when executed, causes the at least one processor to, in part, receive a plurality of data assets from a plurality of data sources, the data assets including a plurality of data sets having one or more characteristics. The system stores the plurality of data assets into a data catalog and determines at least one common characteristic for a first data asset and a second data asset from the plurality of data assets. The system then generates a representation of a first interconnection between the first data asset and the second data asset based on the at least one common characteristic and displays, via a graphical user interface, a governance graph comprising the first interconnection.

In various embodiments, the processor is further caused to determine at least one common characteristic for the second data asset and the third data asset based on the at least one common characteristic; and display, via a graphical user interface, the governance graph including the first interconnection and the second interconnection.

In particular embodiments, the system determines at least one common characteristic for the first data asset and the third data asset from the plurality of data sets, generates a representation of a third interconnection between the first data asset and the third data asset based on the at least one common characteristic, and diplyas, via the gua, the governance graph including the first interconnection, the second interconnection, and the third interconnection.

In some embodiments, the system determines a connection value for the first interconnection, the second interconnection, and the third interconnection. For example, the connection value for the first interconnection may be indicative of a stronger connection than the connection value for the third interconnection. In come embodiments, at least one of the first interconnection and the second interconnection include at least one of an interconnection between data sets, data policies, data procedures, and data usage patterns.

Additionally, disclosed herein is a system for creating a representation of interconnections between data sets, the system including at least one processor, a communication interface communicatively coupled to the at least one processor, and a memory device storing executable code that, when executed, causes the at least one processor to, in part, receive a plurality of data sets from a plurality of data sources; determine one or more data set characteristics fro each of the plurality of data sets, wherein the one or more data set characteristics comprise a data asset; and compare the one or more data set characteristics to determine one or more data sets having common characteristics. In response to determining one or more data sets having common characteristics, the system generates a representation of one or more interconnections between the data sets.

In various embodiments, the system is further configured to display, via a graphical user interface, a governance graph comprising representation of the one or more interconnections between the data sets.

In some embodiments, the one or more interconnections comprise at least one of an interconnection between data sets, data policies, data procedures, and data usage patterns. When determining one or more data sets having common characteristics, the system determines at least one of a common field, a common usage, a common source, a common database, a common generating application, and a common pattern of usage.

According to example embodiments, a system is disclosed herein for data asset access governance, the system including at least one processor, a communication interface communicatively coupled to the at least one processor, and a memory device storing executable code that, when executed, causes the at least one processor to, receive a plurality of data assets from a plurality of data sources and determine one or more data asset characteristics for each of the plurality of data assets. The system compares the one or more data asset characteristics to determine one or more data assets having common characteristics. In response to determining one or more data assets having common characteristics, the system generates a representation of one or more interconnections between the data assets having common characteristics, wherein the representation comprises a governance graph. After receiving, via a user device, a request to access the governance graph, the system displays, via a graphical user interface associated with the user device, the governance graph. The system receives, via the user device, a user selection of at least one data asset of the one or more data assets and, in response, displays via the graphical user interface, the at least one data asset and at least one additional data asset determined to have common characteristics with the at least one data asset selected by the user.

Various embodiments disclose a computer-implemented method for data governance implementation using a governance graph, where the method includes: (1) receiving a plurality of data assets from a plurality of data sources; (2) determining one or more data asset characteristics for each of the plurality of data assets; (3) comparing the one or more data asset characteristics to determine one or more data assets having common characteristics; (4) in response to determining one or more data assets having common characteristics, generating a representation of one or more interconnections between the data assets having common characteristics, wherein the representation comprises a governance graph; (5) receiving, via a user device, a request to access the governance graph; (6) displaying, via a graphical user interface associated with the user device, the governance graph; (7) receiving, via the user device, a user selection of at least one data asset of the one or more data assets; (8) in response to receiving the user selection of the at least one data asset of the one or more data assets, displaying, via the graphical user interface, the at least one data asset and at least one additional data asset determined to have common characteristics with the at least one data asset selected by the user.

In various embodiments, the representation of the one or more interconnections between the data assets having common characteristics displayed on the governance graph comprises a size of a network node, a line between nodes, a thickness of lines between the data assets, and a length of lines between the data assets.

In particular embodiments, a system is disclosed herein for creating a representation of interconnections between data set, the system including at least one processor, a communication interface communicatively coupled to the at least one processor, and a memory device storing executable code that, when executed, causes the at least one processor to, receive a plurality of sources using a computer, the data sets including a plurality of fields and stores the plurality of data sets into a data catalog. The system determines at least one common field for a first data set and a second data set from the plurality of data sets and generates a representation of a first connection between the first data set and the second data set based on the at least one common field. In response to receiving, via a user device, a request to access the first data set, the system displays, via a graphical user interface, a governance graph depicting the first data set, the second data set, and the first connection between the first data set and the second data set.

According to example embodiments, a system is disclosed herein for creating user-specific representations of associations between data assets, the system including at least one processor, a communication interface communicatively coupled to the at least one processor, and a memory device storing executable code that, when executed, causes the at least one processor to, determine that a first user has accessed, via a first user device, a user profile associated with an entity. The system is further configured to receive a plurality of data assets from a plurality of sources, each of the plurality of data assets having one or more characteristics. The system stores the plurality of data assets into a data catalog and compares the one or more data asset characteristics to determine one or more data assets having common characteristics, wherein the one or more common characteristics indicate a connection between the one or more data assets. In response to determining one or more data assets having common characteristics, the system generates a governance graph depicting the one or more connections between the one or more data assets and displays, via a graphical user interface associated with the first user device, the governance graph depicting the one or more connections. The system then determines that a second user has accessed, via a second us, an executive-level profile associated with the entity. The system generates an executive-level governance graph depicting one or more factors associated with the plurality of data assets and displays, via a graphical user interface associated with the second user device, the executive-level governance graph depicting the one or more factors associated with the plurality of data assets.

In example embodiments, the first user has a first level of security clearance associated with the entity and the second user has a second level of security clearance associated with the entity, wherein the second level of security clearance is higher than the first level of security clearance.

In particular embodiments, the executive-level governance graph depicts one or more usage patterns as nodes, wherein a first node having a first size depicts a first level of usage and a second node having a second size depicts a second level of usage, wherein the first node is larger than the second node, and wherein the larger node depicts a higher or greater level of usage of a data set.

In various embodiments, the one or more factors associated with the plurality of data assets comprises one or more relationships between each of the plurality of data assets, and wherein the one or more relationships are depicted as lines. In particular embodiments, the length of each of the lines depicting the one or more relationships between the plurality of data assets indicates the degree of connection between each of the plurality of data assets, wherein a longer line indicates a lesser degree of connection and a shorter line indicates a greater degree of connection between the data sets. Similarly, the thickness of each of the lines may also be used to indicate the degree of connection, where a thinner line indicates a lesser degree of connection and a thicker line indicates a greater degree of connection between the assets.

In example embodiments, the executive-level governance graph depicts a lineage of the plurality of data assets, wherein the lineage of the plurality of data assets tracks flows and changes of the plurality of data assets over time.

In some embodiments, the system may be access by a data steward to clean up the data sets by eliminating any duplicate data assets stored in the data catalog.

According to example embodiments, a computer-implemented method for creating user-specific representations of associations between data assets is disclosed including the steps of: (1) determining that a first user has accessed, via a first user device, a user profile associated with an entity; (2) receiving a plurality of data assets from a plurality of sources, the data assets having one or more characteristics; (3) storing the plurality of data assets into a data catalog; (4) determining one or more data asset characteristics for each of the plurality of data assets; (5) comparing the one or more data asset characteristics to determine one or more data assets having common characteristics, wherein the one or more common characteristics indicate a connection between the one or more data assets; (6) in response to determining one or more data assets having common characteristics, generating a governance graph depicting the one or more connections between the between the one or more data assets; (7) displaying, via a graphical user interface associated with the first user device, the governance graph depicting the one or more connections; (8) determining that a second user has accessed, via a second user device, an executive-level profile associated with the entity; (9) generating an executive-level governance graph depicting one or more factors associated the plurality of data assets; and (10) displaying, via a graphical user interface associated with the second user device, the executive-level governance graph depicting the one or more factors associated with the plurality of data assets.

In example embodiments, the executive-level governance graph depiction of the one or more factors associated with the plurality of data asset is at least one of a pattern of usage, a level of risk, and a degree of confidentiality for each of the data assets of the plurality of data assets.

In various embodiments, the one or more usage patterns of the plurality of data assets includes at least one of compliance with a governance policy associated with the entity and non-compliance with the governance entity associated with the entity.

In some embodiments, the one or more data assets have common characteristics that are direct connections and some data assets have indirect common characteristics.

According to various embodiments, a computer-implemented method for creating a user-specific representation of associations between data assets includes the steps of: (1) receiving a plurality of data assets from a plurality of sources, the data assets having one or more characteristics; (2) storing the plurality of data assets into a data catalog; (3) determining that a user has accessed, via a user device, an executive-level profile associated with an entity; (4) generating an executive-level governance graph depicting one or more factors associated the plurality of data assets; and (5) displaying, via a graphical user interface associated with the user device, the executive-level governance graph depicting the one or more factors associated with the plurality of data assets.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION OF EMBODIMENTS OF THE INVENTION

Figure 1:
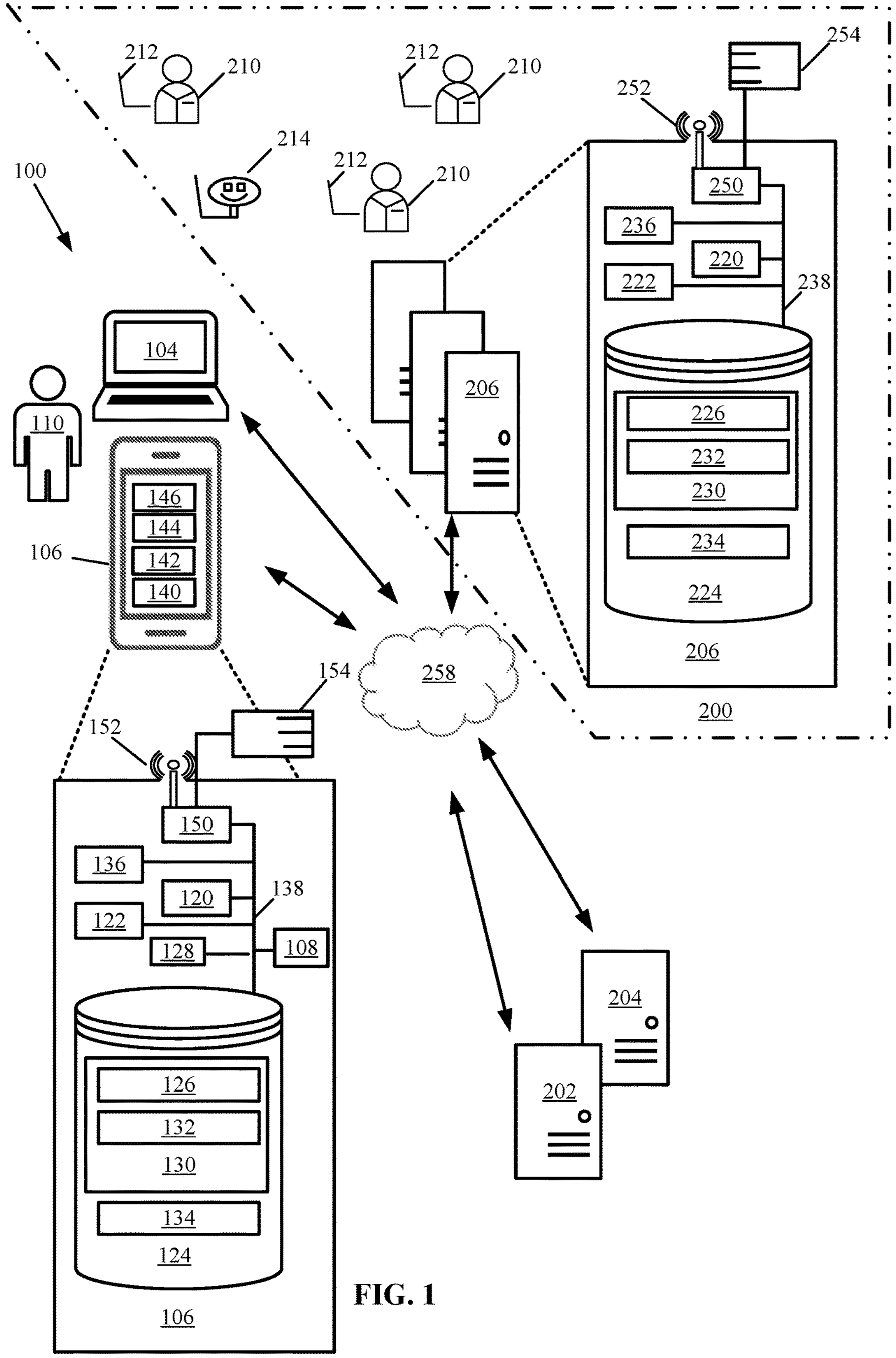
FIG. 1 illustrates an enterprise system and environment thereof for creating a governance graph of data asset connections for digital assets in a data catalog, in accordance with an embodiment of the present invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms “coupled,” “fixed,” “attached to,” “communicatively coupled to,” “operatively coupled to,” and the like refer to both (i) direct connecting, coupling, fixing, attaching, communicatively coupling; and (ii) indirect connecting coupling, fixing, attaching, communicatively coupling via one or more intermediate components or features, unless otherwise specified herein. “Communicatively coupled to” and “operatively coupled to” can refer to physically and/or electrically related components.

Embodiments of the present invention described herein, with reference to flowchart illustrations and/or block diagrams of methods or apparatuses (the term “apparatus” includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s) —with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wide-band (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, Internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the Internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2A:
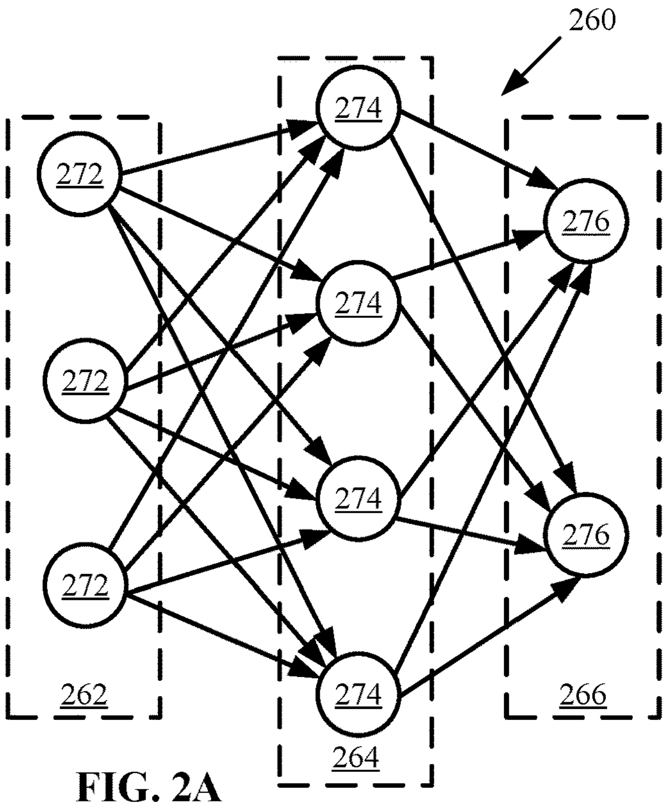
FIG. 2A is a diagram of a feedforward network, according to at least one embodiment, utilized in machine learning
Figure 2C:
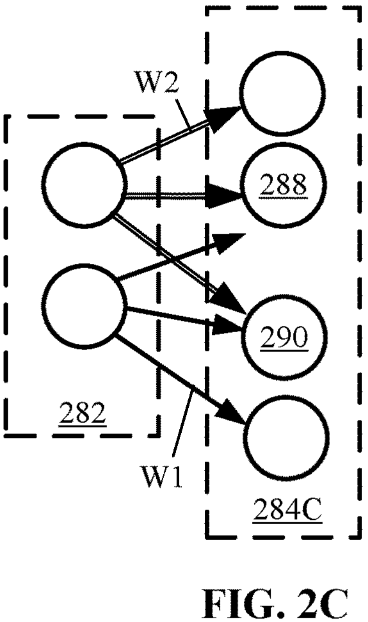
FIG. 2C is a diagram of a portion of the convolution neural network of FIG. 2B, according to at least one embodiment, illustrating assigned weights at connections or neurons.
Figure 2B:
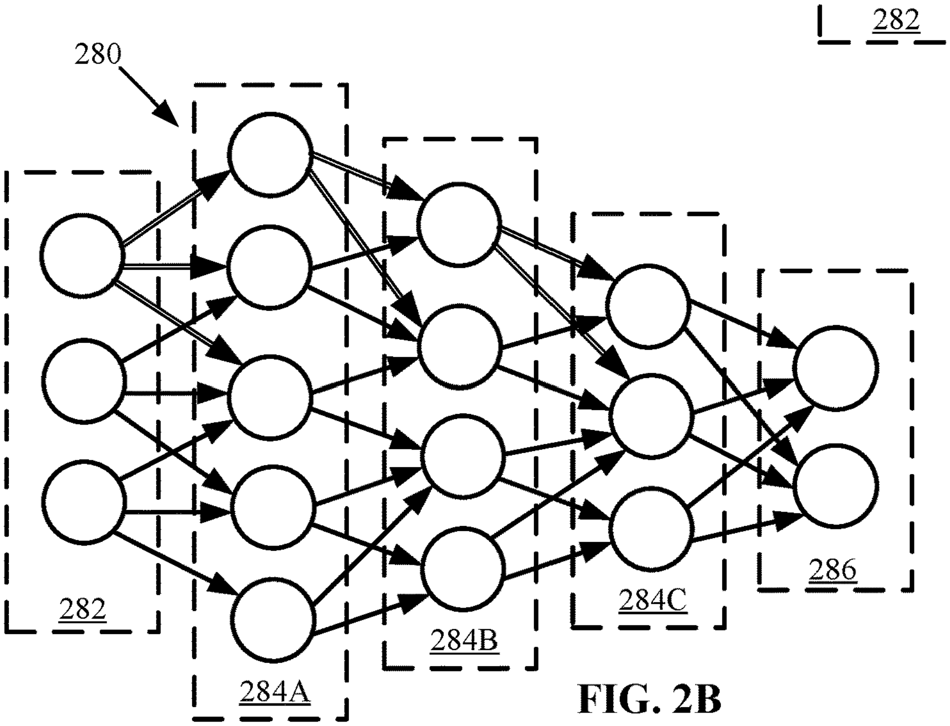
FIG. 2B is a diagram of a convolution neural network, according to at least one embodiment, utilized in machine learning.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
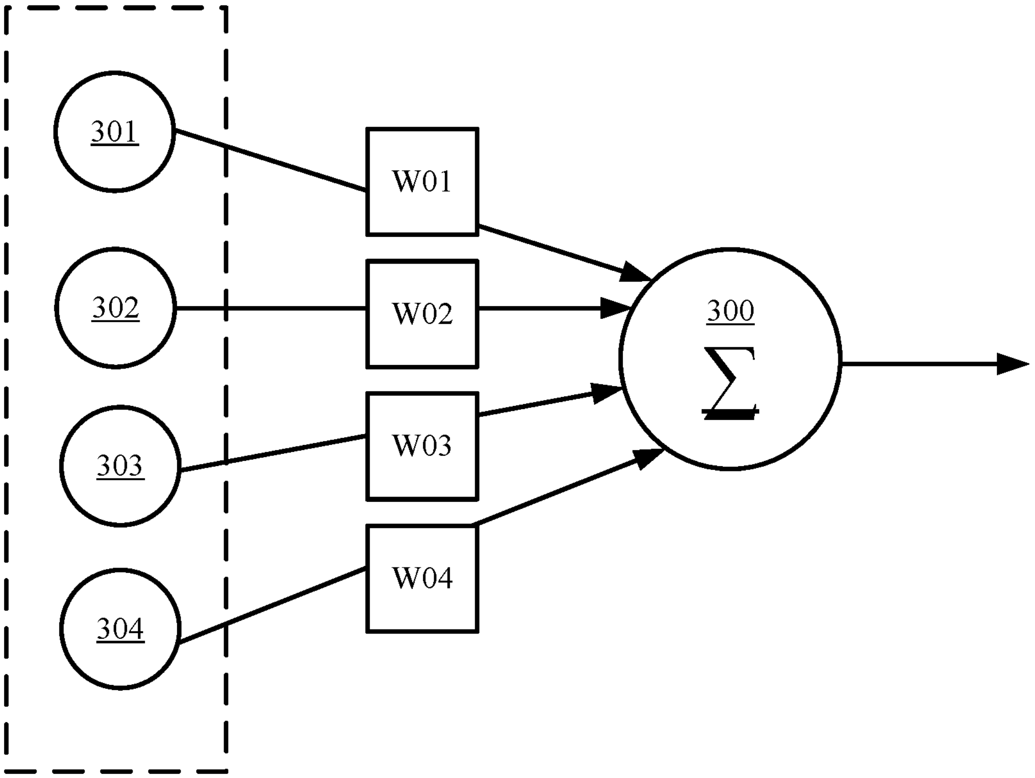
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
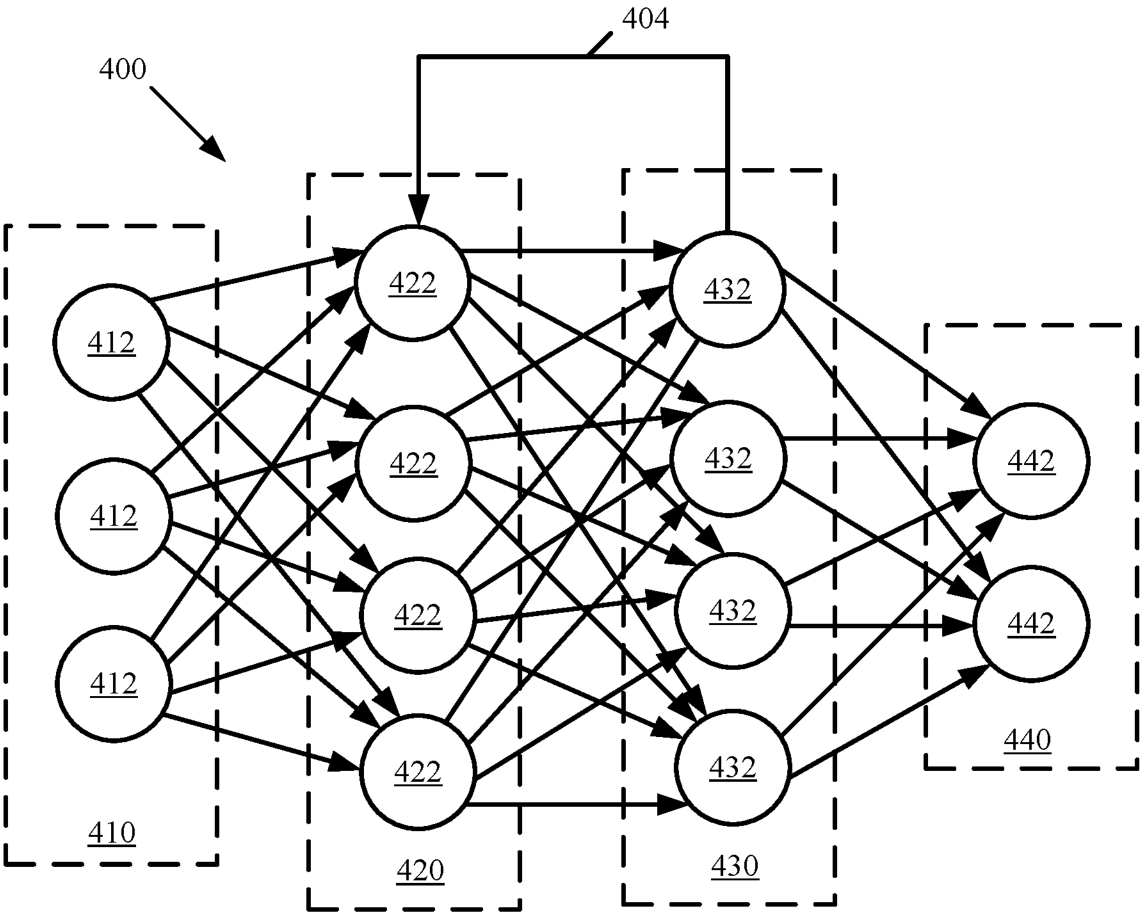
FIG. 4 is a diagram of a Recurrent Neural Network RNN, according to at least one embodiment, utilized in machine learning.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Figure 5:
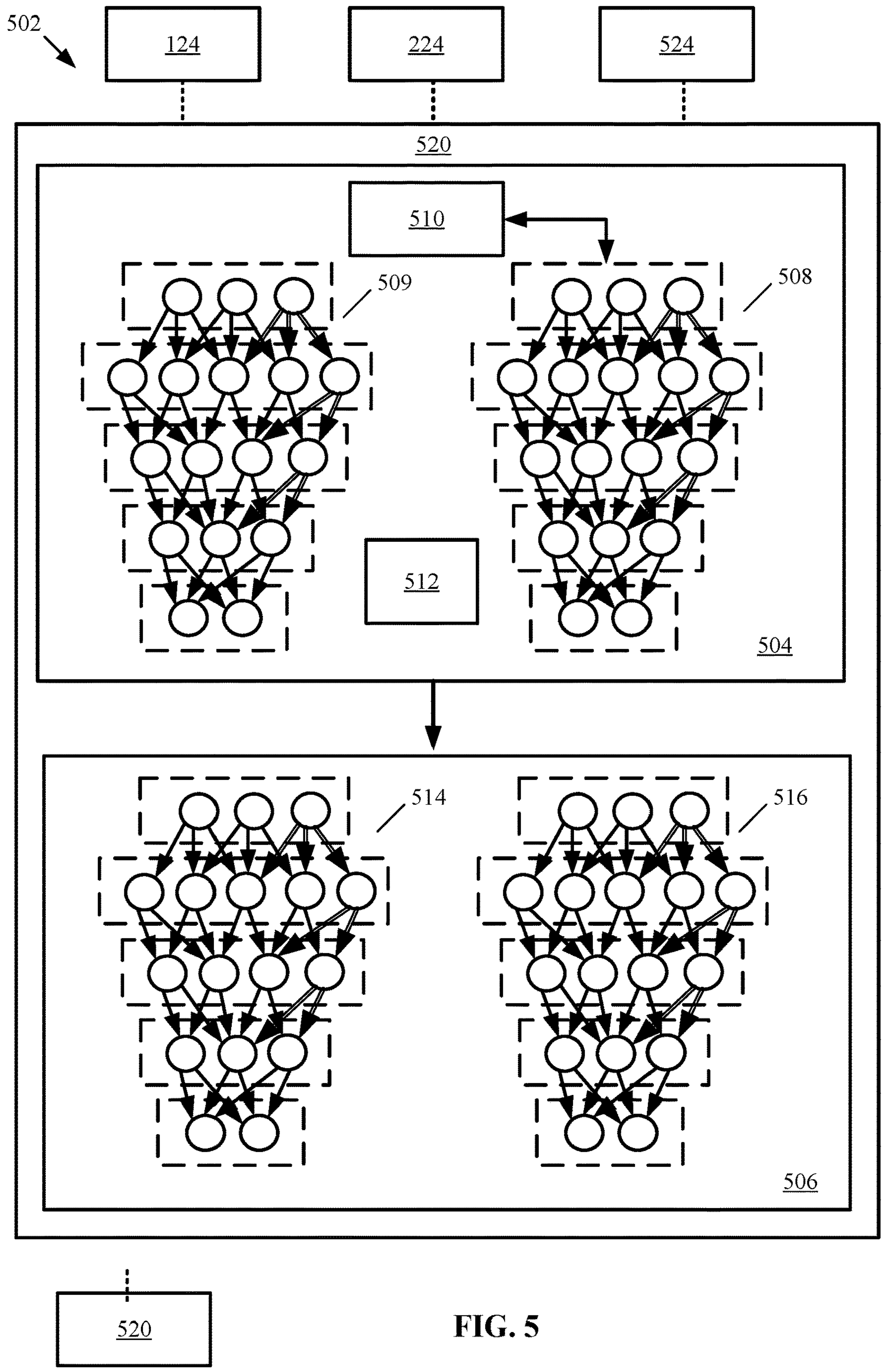
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 6:
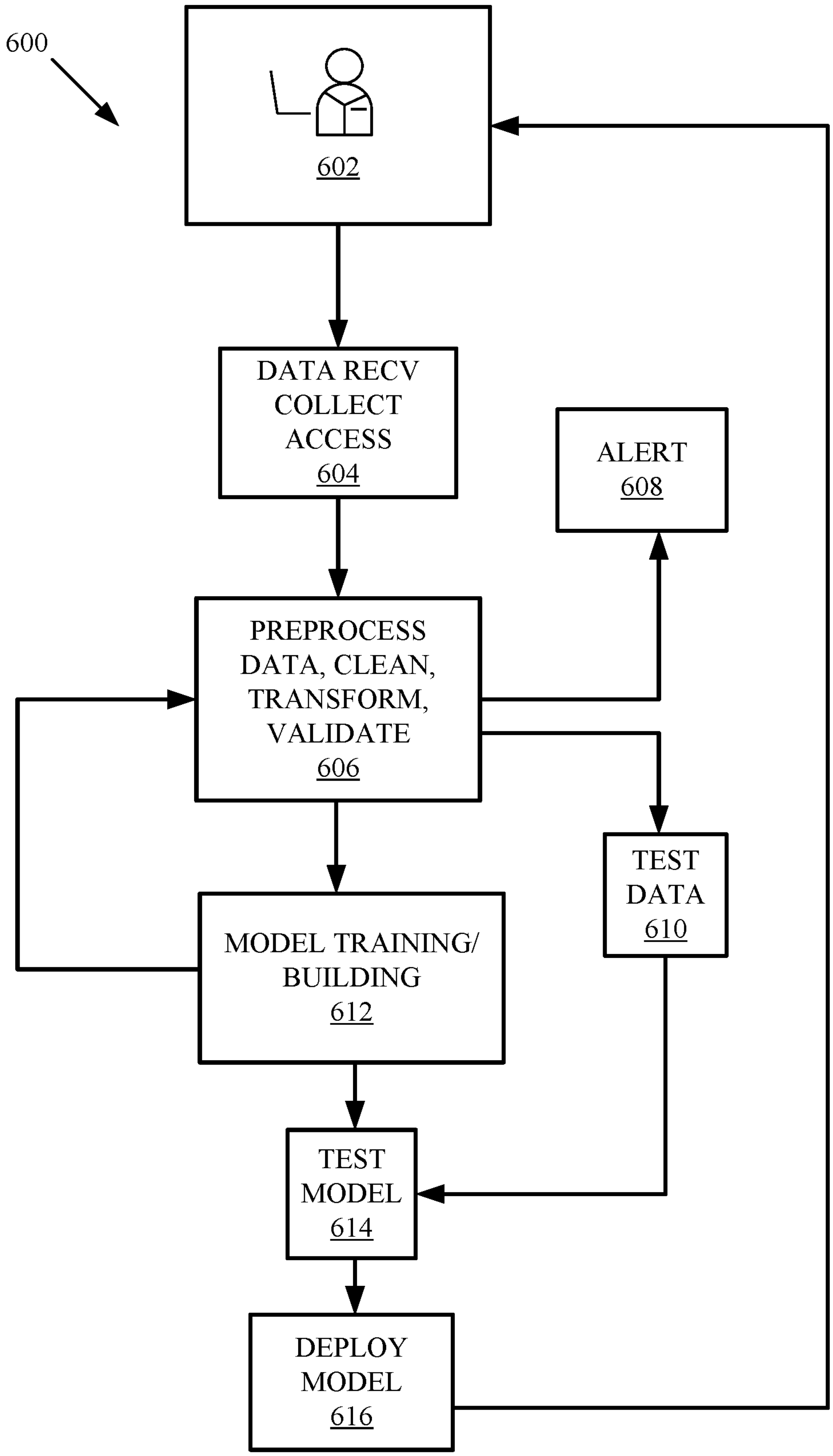
FIG. 6 is a flow chart representing a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Figure 7:
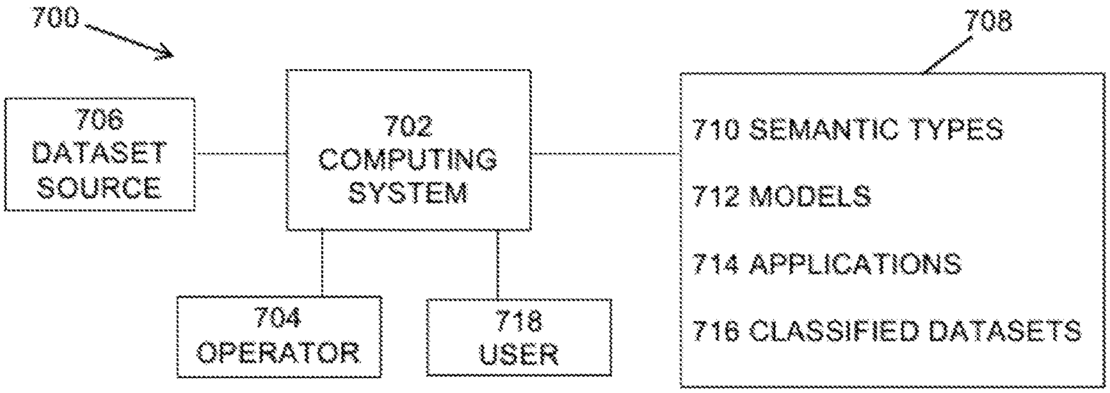
FIG. 7 is a diagram of a system for classifying datasets according to the invention.

FIG. 7 illustrates a classification system 700 for classifying datasets according to at least one embodiment of the invention. The dataset classification system 700 is similar to the enterprise system 200 of FIG. 1 and includes a computing system 702 similar to the computing system 206 of FIG. 1. Therefore, corresponding details of the systems 200 and 206 are not repeated here. At least one operator uses a device 704 (for example, computing device 104 or mobile device 16 shown in FIG. 1) to communicate with the computing system 702 to perform tasks such as inputting datasets, defining and modifying semantic types, defining and modifying classification models, approving classification recommendations, approving confidence labels, etc.

The computing system 702 also communicates with a dataset source(s) 706 to receive datasets to be classified. The source 706 can be an enterprise operating the classification system 700 wherein all of the datasets are generated within the enterprise. Alternatively or in addition, the source 706 could be one or more independent dataset sources that are accessed via the Internet. Thus, the datasets can be received by the computing system 702 from the source(s) 706 automatically or as selected by the operator using the device 704. The datasets typically include a plurality of data fields arranged in a column and row format. The top row typically contains column names.

A memory or storage device 708 is connected with the computing system 702 for exchanging data. The storage device 708 has a first area 710 storing predefined semantic types. The semantic types can be created and modified by the operator using the device 704 and/or by the entity controlling the dataset source 706. A second area 712 in the storage device 708 stores predefined classification models. These models typically include known algorithms for classifying data entries in a dataset. However, based upon experience and machine learning, the known models can be modified and/or new models can be created for more accurate classification results. A third area 714 in the storage device 708 stores computer-readable instructions for an operating system and various software applications. One of stored applications enables the automated classification of datasets according to the invention. A fourth area 716 in the storage device 708 stores datasets to be classified that have been received from the source(s) 706 and datasets previously classified according to the method of the invention.

At least one user can use a device 718 to communicate with the computing system 702 to perform activities related to the datasets. First, the user can download datasets to be classified from the source(s) 706. For example, the user can be authorized to download an updated version of a previously classified dataset rather than notifying the operator via the device 704 to perform this activity. Then classification of the updated dataset can be automatic or require approval by the operator. Second, the user can be authorized to access the classified datasets stored in the fourth area 716 for use in assigned tasks. For example, the task could require sending an email message to all customers with an address in a selected state. The user would search the fourth area 716 for a classified dataset containing customer email addresses and state codes.

Figure 8:
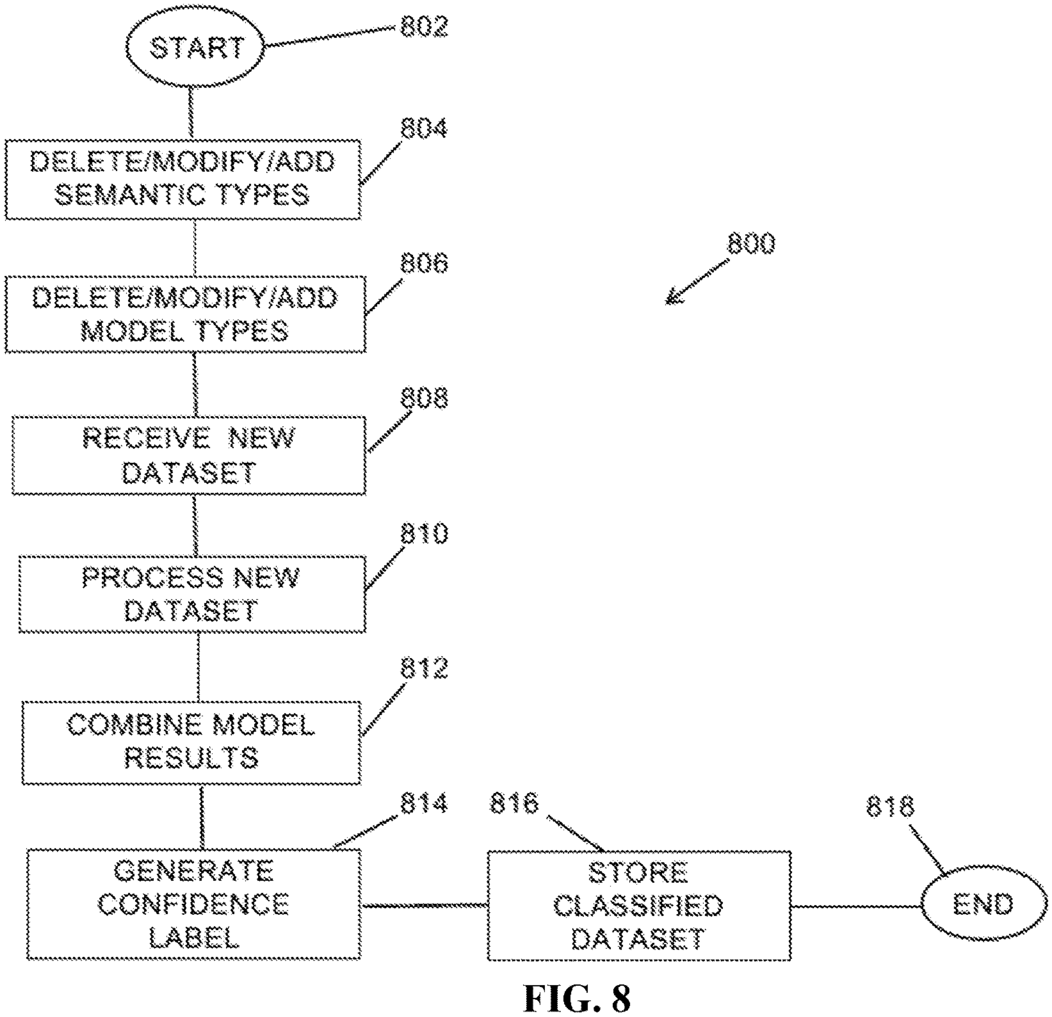
FIG. 8 is a flow diagram of a method for classifying datasets according to the invention.

FIG. 8 is a flow diagram 800 of a classification method according to at least one embodiment of the invention. The method begins at START 802 and, in a step 804, the operator via the device 704 (FIG. 7) can delete and/or modify semantic types stored in the first area 710 of the storage device 708 and can add new semantic types. Next, in a step 806, the operator can delete and/or modify model types stored in the second area 712 of the storage device 708 and can add new model types.

The method then enters a step 808 wherein the computing system 702 receives a new dataset from the source 706. As explained above, the new dataset can be completely new or an updated version of a previously classified dataset. Next, in a step 810, the computing system 702 begins processing the new dataset using the semantic types stored in the first area 710 and two or more of the models stored in the second area 712 to identify the data entries included in the new dataset. The method examines every column in the dataset to identify the data in the data fields by one of the semantic types. The models being used look at what the column is named and the format of the data in the data fields of the column. The operator has the ability to accept, reject or modify the identified semantic types. Once accepted, the semantic types are added to the metadata associated with the dataset.

Figure 9:
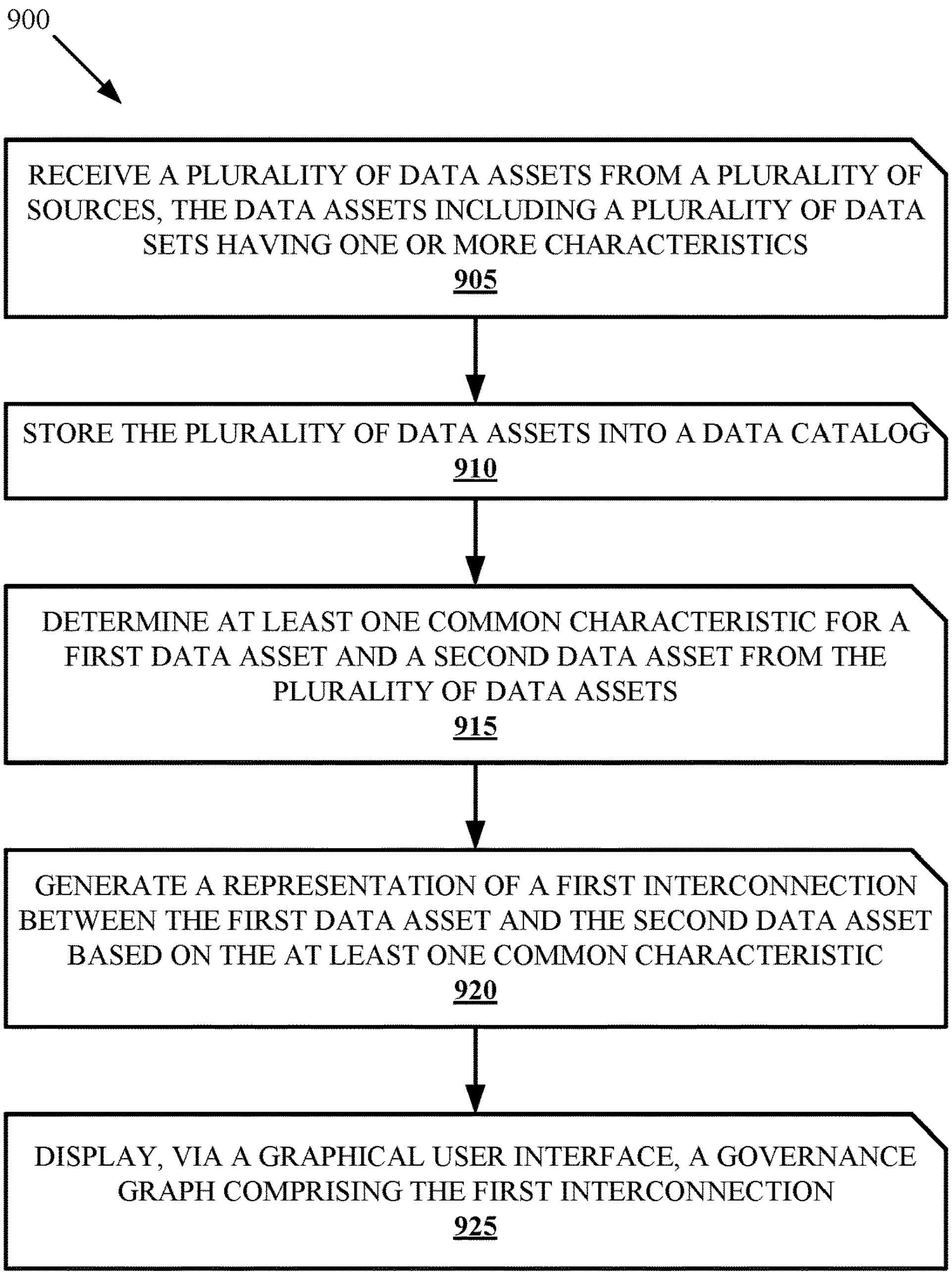
FIG. 9 depicts a block diagram of a method for creating a representation of interconnections between data assets in a data catalog, in accordance with an embodiment of the present invention.

FIG. 9 depicts a flow chart representing a system and method 900, according to at least one embodiment, for creating a representation of interconnections between data assets in a data catalog. The method 900 represents at least one example of steps which may be implemented to create a data governance graph for establishing and creating connections between datasets and for understanding said connections. Owners and managers of data assets in an organization need to understand how the assets are related and how they are connected to each other in order to select or promote and use the best content for any particular business need. Proper data governance is necessary to ensure that data is handled appropriately, efficiently, and securely in an organization. A governance graph provides a structural and visual representation of the connective tissue of datasets under management. The present invention relates particularly to establishing and creating connections between data sets or assets in order to easily understand and present the connections in a visual way which is more easily comprehended. The governance graph also allows a user to become more comfortable with the system, and therefore more efficient in their work that requires accessing various data sets because it provides recommendations to the user and helps them to better and more quickly understand the data.

Digital assets have inherent traits such as metadata and data fields that are common or similar across multiple items. Observing their connectedness based on these similarities allows a data steward to understand the data under management and develop proper governance.

A governance graph is a representation of interconnections between data assets in a data catalog comprising the connections between the elements of data sets, the common policies and procedures between them, and their usage patterns. Each of these factors could be known, observed, or inferred from related factors. Individual assets appear as nodes in a network formation with connections indicated as lines. Asset connections comprise metadata and data fields which share common attributes. Connections are represented with varying strength based on the degree of commonality and similarity between the attributes of the nodes.

Benefits of a governance graph include: (1) improved management and governance by providing streamlined and automated application of descriptive business metadata; (2) improved discoverability by providing inputs to search and to display relevance; (3) improved risk management by highlighting factors of concern and leading to improved governance criteria; (4) improved efficiency through surfacing the most important assets to manage and enable for use; and (5) improved understanding of assets under management through visualization of the assets and their connections.

Individual datasets will have a "data profile" summarizing the data shape and characteristics. Datasets also have usage patterns comprising user interactions, downstream reports, presence in workflows, input or output connections to machine learning models, and other actions or connections. Other types of digital assets, including reports from business intelligence applications and digital files of various content types, will have similar connections to each other and to the datasets that are their inputs. All digital assets have metadata that can be used to infer their connections. By examining the inherent relationships with each other from their metadata, common data fields, and usage in user workflows, a system can create a representation of relationships that can be used to make recommendations or provide guidance to users.

At block 905, the processor receives a plurality of data sets from a plurality of sources using a computer, the data sets including a plurality of traits. Example dataset traits include metadata fields, data usage, data sources including various databases, applications that utilize the data, and patterns of usage of the data. In example embodiments, the data sets may be new data sets or updated versions of previously received datasets. Columns for each of the plurality of data sets are analyzed to identify data in the data fields and to determine column names, fields, records, rows, and the format of the data in the data fields. The metadata contains data about the entire data asset, and the data set may be summarized into a profile that includes the particular characteristics or traits of the data sets.

At block 910, the plurality of data sets and/or data assets are stored into a data catalog. The data catalog is then available for use by any user associated with an entity and having proper authority to access the data catalog. Thus, the system connects to various data sources, examines the data and the sources, ascertains certain features such as data tables, and examines the metadata to create an entry into the data catalog. When browsing the data catalog to find datasets that may be useful for the particular user's business purpose, the user may sort the catalog by various characteristics, allowing for more efficient business processes. In addition, a data steward is responsible for the overall stewardship and/or governance of the use of the assets, including confirming that the assets are being used appropriately and that they are fit for the purpose they are being used for.

At block 915, at least one common characteristic is determined for a first data asset and a second data asset from the plurality of data assets. In example embodiments, the common characteristic or trait may be any of a common field, common usage, common source, common database, common generating application and/or a common pattern of usage. In some embodiments, the process is repeated such that the system determines at least one common trait for the first data set and a second, third, fourth, etc. data set from the plurality of data sets. The more comparisons and common characteristics that the system discovers, the more robust and useful the governance graph will be.

At block 920, a representation of a first interconnection between the first data asset and the second data asset is generated based on the at least one common characteristic. For example, any one of the various characteristics may be found to be common between the first data asset and the second data asset. For example, where both data assets have a common trait or characteristic such as at least one common field, a common usage, a common source, a common database, a common generating application, and/or a common pattern of usage, the system may determine that a connecting exists between the first data set and the second data set and generate a representation showing such an interconnection. In various embodiments, the interconnection may be a relationship between data sets, data policies, data procedures, and/or data usage patterns. For example, where a user typically uses a first data set in conjunction with a second data set, but no other recognizable similarities are uncovered, the system may determine that the there is an interconnection between the first data set and the second data set.

In example embodiments, the interconnections between the data sets are represented by one or more nodes and/or lines that have varying sizes and structure indicated the level of connectedness. For example, where a first data set is very closely related to a second data set, the line between the first data set and the second data set as shown on the governance graph may be shorter than other lines that indicate a more distant relationship or the line may be thicker to draw the attention of the user showing that the connection is a strong association. Thus, in various embodiments, stronger connections will be more readily recognized than a weaker connection between data sets as depicted by the governance graph.

At block 925, the governance graph is displayed via a graphical user interface showing each of the interconnections discerned by the system. For example, where there is a first data set, a second data set, and a third data set, while the data sets may be shown as nodes, the interconnections between the data sets may be displayed as lines having various lengths and widths. In particular embodiments, some nodes may only be tangentially related to another node. For example, where data set "A" is directly related to data set "B", there may be a thick, thin line between "A" and "B". In contrast, where data set "A" is only indirectly related to data set "B", there may be a line linking "A" and "B" but no line linking "A" to "C", but given the relationship between "A" and "B", a user would be able to determine that "A" to "C" are at least indirectly related and any changes to data set "A" would like affect data set "C".

In example embodiments, a user may download one or more data sets based on the common characteristics of the data sets. Although the system is unable to determine what is done with the data sets once they have been downloaded, if the user were to upload the data sets after making changes to them on their personal computing system, the system would create an alert either to the user, the data steward, or to other users who may be using that particular dataset. This alert allows the system to trace and track all changes made to the data sets so that the data does not become corrupted, especially since there are downstream, cascading effects to any change to any particular data asset. In example embodiments, the alert may be a pop-up directly on the user's device alerting them to the consequences of their actions that requires them to approve the change. Another failsafe would be to also remit an alert to the data steward responsible for the particular data asset, so that, if drastic enough, the data steward can prevent any bigger issues from occurring.

Essentially, the governance graph creates a holistic view of the impact of changes made and how they may affect the system as a whole, including consequences of the various action taken, and other data sets that may seem unrelated but that would also be affected by any change made to a particular data set. This is imperatively important when it comes to new users accessing the system who may be unfamiliar with the system and make changes that they believe to be correct but that ultimately affect others. However, because the system traces every change made, it is easy to trace the changes back and return the data to is correct form.

Figure 10A:
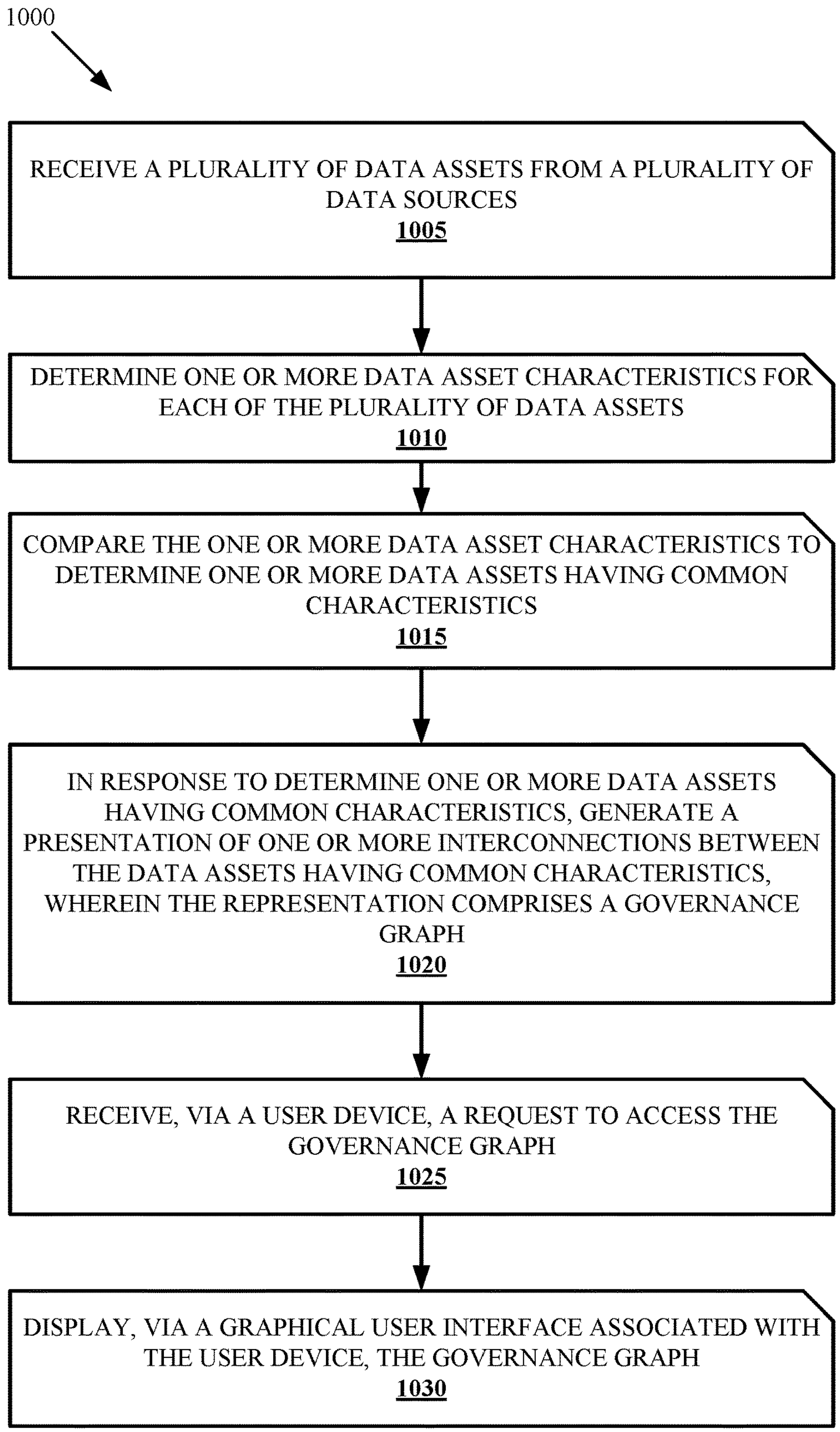
FIGS. 10A-10B depict a block diagram of a method for data access for data governance, in accordance with an embodiment of the present invention.
Figure 10B:
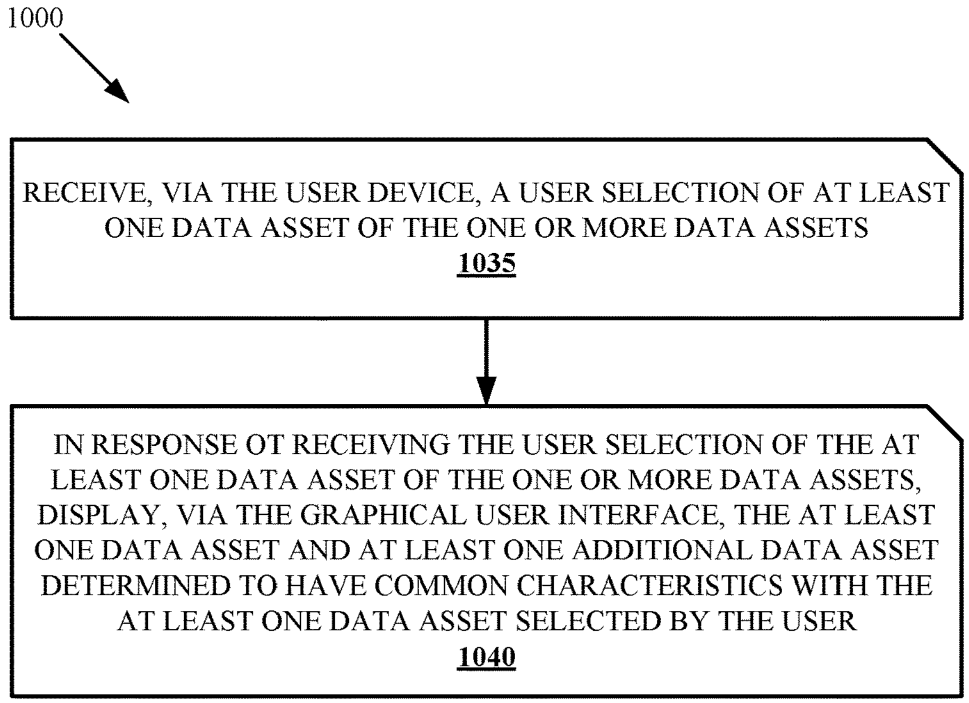

FIGS. 10A-10B depict a flow chart representing a system and method 1000, according to at least one embodiment, for data asset access governance. The method 1000 represents at least one example of steps which may be used to understand the relationship between data assets on a governance graph and for assisting with various business projects by recommending to users related data assets currently being accessed by the particular user.

At block 1005, the system receives a plurality of data assets from a plurality of data sources and, at block 1010, the system determines one or more data asset characteristics for each of the plurality of data assets. As may be readily understood, each data set or asset includes a plurality of characteristics accounted for in the metadata. At block 1015, the system compares one or more data asset characteristics to determine one or more data assets having common characteristics. In example embodiments, the one or more data asset characteristics may be a field, a usage, a source, a database, a generating application, or a pattern of usage. For example, where a user common uses two unrelated data sets at the same time, the system may deduce that the data assets have common characteristics leading to the user using them create a connection between the data sets within the governance graph.

At block 1020, in response to determining one or more data assets having common characteristics, the system generates a representation of one or more interconnections between the data assets having common characteristics, wherein the representation is depicted as a governance graph. In example embodiments, the one or more interconnections between the data assets having common characteristics are displayed on the governance graph using edges, lines, or labels. In some embodiments, any data sets not having common characteristics may be blurred, lightened, removed, or have the color changed in order to show that the two particular data sets are not even indirectly related. This type of visual indication makes it easier for a user to determine the relationship between the data sets rather than just relying on common search terms to find what they are looking for.

At block 1025, the system receives, via a user device, a request to access the governance graph and, at block 1030, the system displays, via a graphical user interface associated with the user device, the governance graph.

Continuing to block 1035, the system receives, via the user device, a user selection of at least one data asset of the one or more data assets and, in response, at block 1040, the system displays via the graphical user interface, the at least one data asset and at least one additional data asset determined to have common characteristics with the at least one data asset selected by the user. In various embodiments, the governance graph may be depicted using various size nodes and lines, as discussed above, where the length, thickness, or size of the node or line indicates the interconnectedness of the data sets.

Figure 11A:
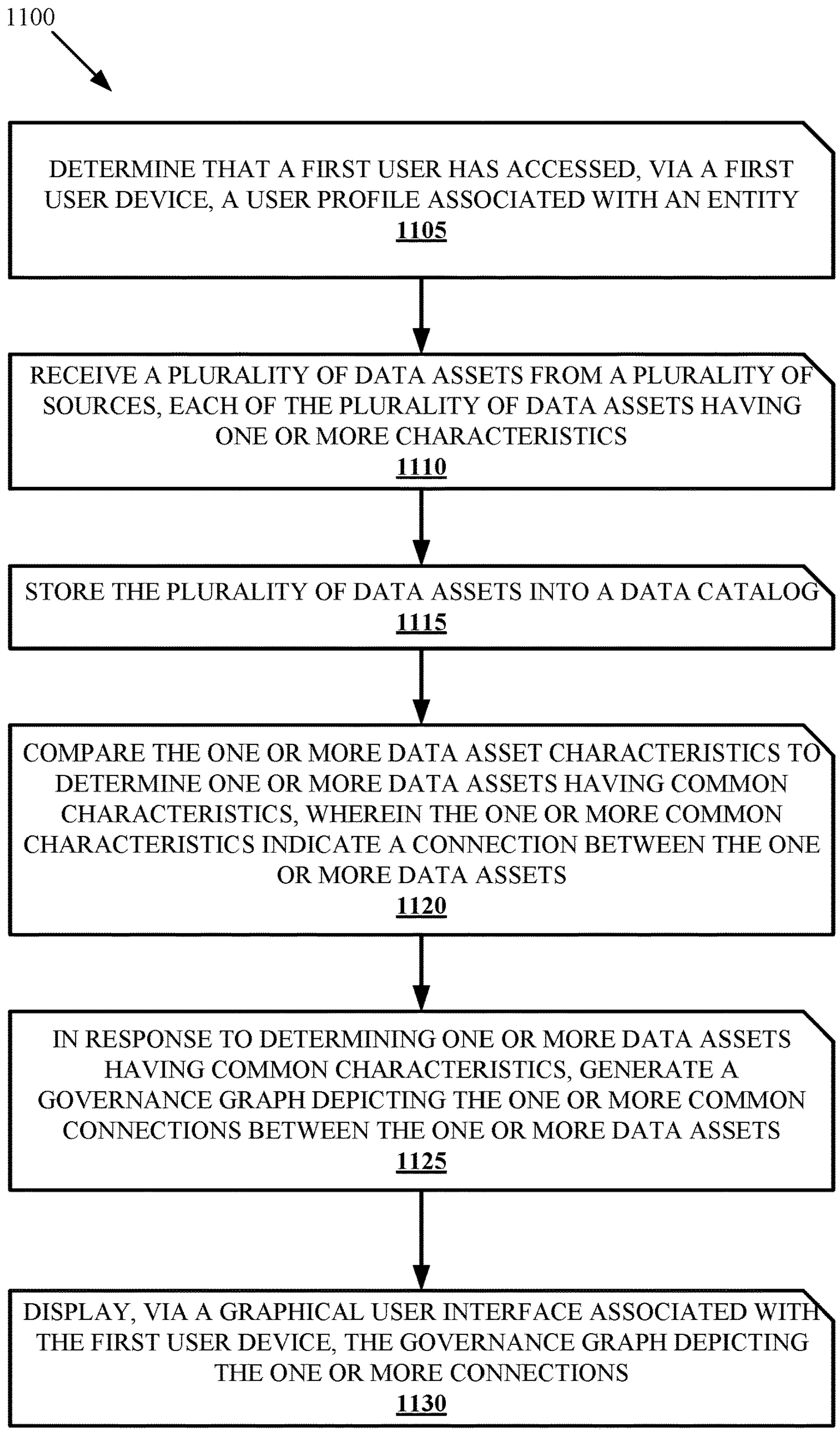
FIGS. 11A-11B depict a block diagram of a method for creating user-specific representations of associations between data assets, in accordance with an embodiment of the present invention.
Figure 11B:
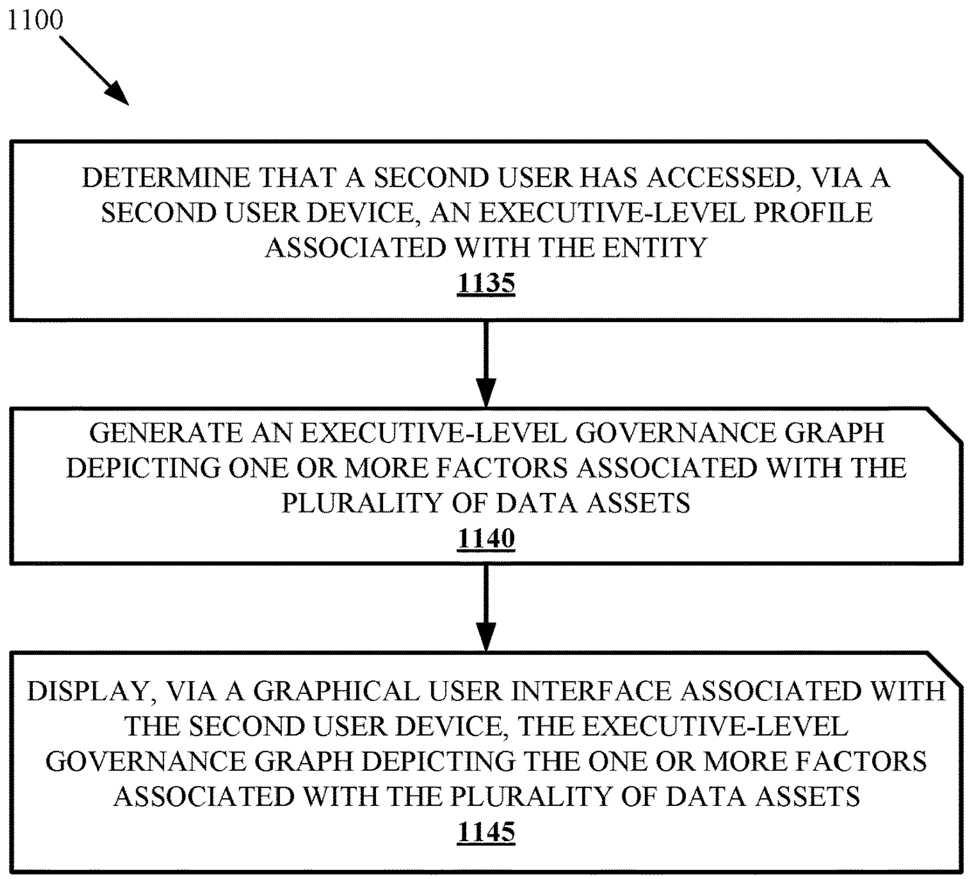

FIGS. 11A-11B depict a flow chart representing a system and method 1100, according to at least one embodiment, for creating user-specific representations of associations between data assets. The method 1100 represents at least one example of steps which may be used to understand create a high-level depiction of the relationships between the various data assets on a governance graph in order to assist an executive level employee with make quick decisions while having a greater understanding of various risk factors, how the data assets are being utilized, and weather the various users are complying with the various data asset governance policies. Thus, the governance graph may be particularly useful in terms of governance policies by showing an executive-level user an increased demand for a particular dataset, by tracking suspicious or inappropriate use of data, and by allowing the user to determine the value of the dataset as a w hole. In particular embodiments, the system may use the various clearance levels or login credentials of a particular user to create a profile for that user, where the user is also directed to their preferred governance graph that displays the information that are interested in viewing or utilizing.

At block 1105, the system determines that a first user has accessed, via a first user device, a user profile associated with an entity. In example embodiments, the first user may be an employee of the entity in the marketing or sales department, thus having a lower level of security clearance than, for instance, an employee in the IT department. Thus, the first user may be unable to access certain aspects of the data catalog as those may require a higher level of security clearance.

At block 1110, the system receive a plurality of data assets from a plurality of sources, each of the plurality of data assets having one or more characteristics.

At block 1115, the system stores the plurality of data assets into a data catalog for later access by the first user and any other user given access to the data catalog. In various embodiments, the data assets may be stored on-premises or in a cloud infrastructure.

At block 1120, the system compares the one or more data asset characteristics to determine one or more data assets having common characteristics, wherein the one or more common characteristics indicate a connection between the one or more data assets.

At block 1125, in response to determining one or more data assets have common characteristics, the system generates a governance graph depicting the one or more common connections between the one or more data assets. In various embodiments, when determining whether the one or more data assets have common characteristics, the system determines whether the one or more data assets have a common characteristic via at least one of a direct connection or an inferred connection. A direct connection, for example, may be where one data set is directly downstream from another data set. In contrast, an indirect connection may include a connection between how the data sets are used. For example, where "B" is often used with "C" but the system is unable to determine any other connection between the two data sets, the connection between "B" and "C" is inferred and depicted in the governance graph.

At block 1130, the system displays, via a graphical user interface associated with the first user device, the governance graph depicting the one or more connections. In various embodiments, the governance graph may be depicted using various size nodes and lines, as discussed above, where the length, thickness, or size of the node or line indicates the interconnectedness of the data sets.

At block 1135, the system determines that a second user has accessed, via a second user device, an executive-level profile associated with the entity. In various embodiments, the second user may include an executive, or other C-suite level employee of the entity that performs high-level business functions for the entity and is called upon to make business decisions for the entity.

At block 1140, the system generates an executive-level governance graph depicting one or more factors associated with the plurality of data assets and, at block 1145, the system displays, via a graphical user interface associated with the second user device, the executive-level governance graph depicting the one or more factors associated with the plurality of data assets.

Given the difference in the roles of the first user and the second user with respect to the entity, each user is utilizing their respective governance graph for different purposes. For example, the first user may be using a particular data set and trying to find via various connections or interconnections other data sets that share common characteristics such as a common field, a common usage, a common source, a common database, a common generating application, or a common pattern of usage, as discussed in detail above. In contrast, the second user at the executive-level may be utilizing their respective governance graph to determine whether particular data assets are even being used and if their worth maintaining. Or the executive-level user may be trying to determine any potential governance issues by assessing patterns of use of particular data sets and the level of personal information contained in the particular data set. For example, if an executive-level user notices that a particular data set on the governance graph is accessed quite frequently but that it contains highly confidential data, this may raise some red flags for the business that may need to be investigated. For example, a user may be able to determine based on the pattern of usage of a plurality of data assets whether there is compliance or non-compliance with an entity governance policy.

In various embodiments, the governance graph may indicate patterns of usage by depicting the data sets as different sized nodes, where a first node having a first size depicts a first level of usage and a second node having a second size depicts a second level of usage. In this example, if the first nodes is larger than the second node, a user would be able to determine that the larger node depicts a higher level of usage of that particular data asset.

In addition to the first user and the second user, a third user, such as a data steward, may access the system via a third user device. The system may receive a second plurality of data assets from the third user and store those assets into the data catalog. In order to maximize the use of memory available, the system may then compare the second plurality of data assets to the plurality of data assets to eliminate duplicate data assets. Once the duplicates have been deleted, the system generates a new or updated governance graph based on the plurality of data assets and the second plurality of data assets with the duplicate data assets eliminated.

Figure 12:
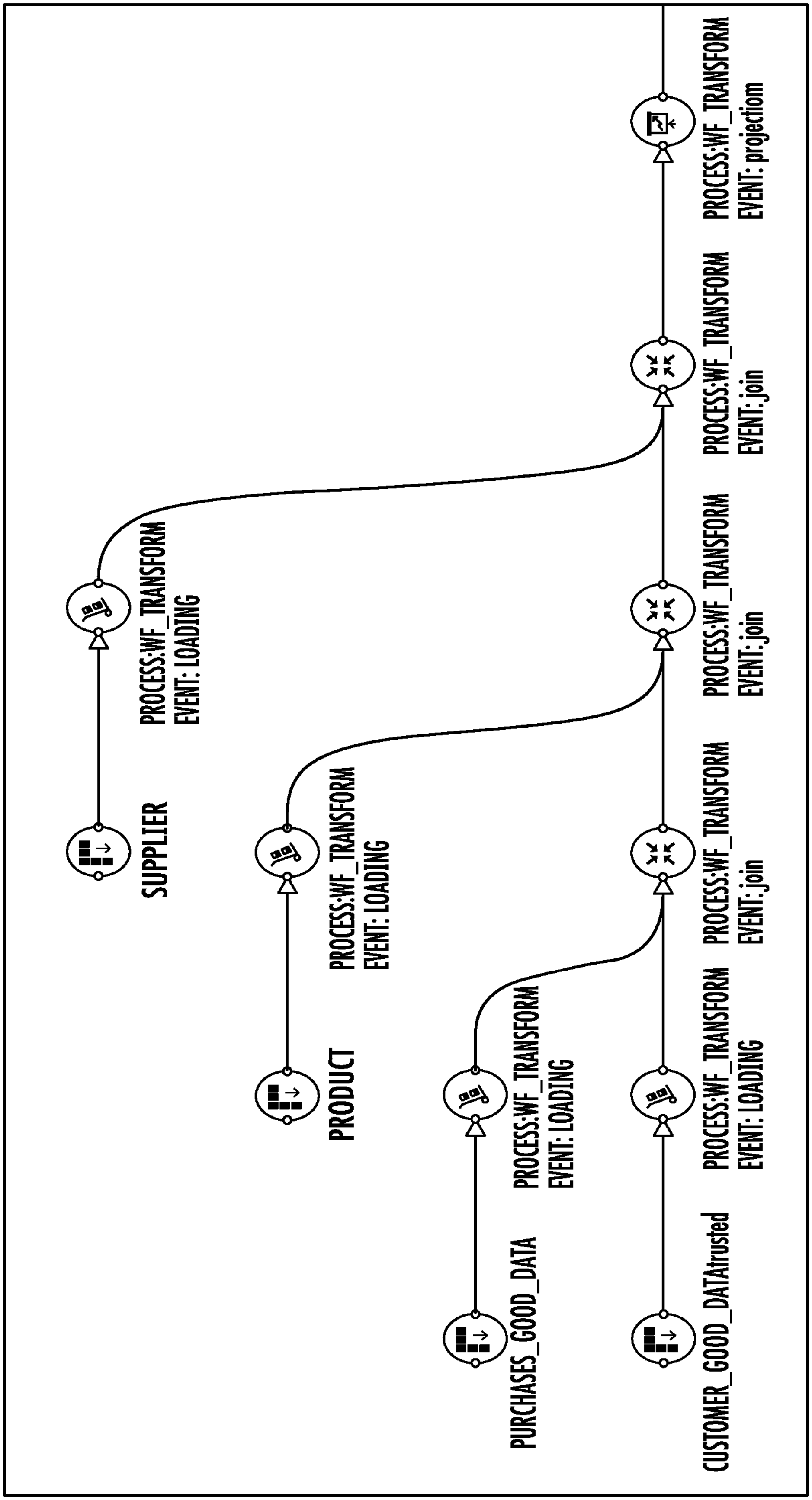
FIG. 12 depicts an exemplary governance graph, in accordance with an embodiment of the present invention.
Figure 13:
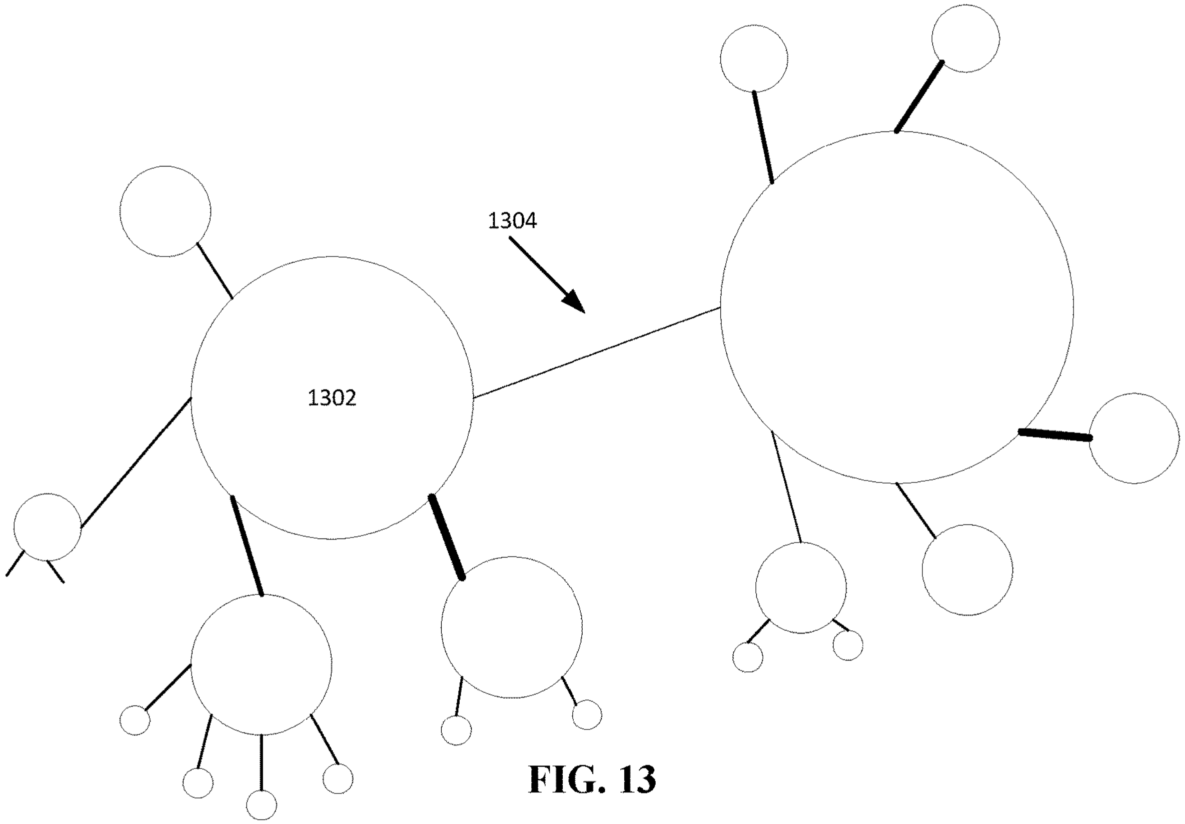
FIG. 13 depicts an alternate exemplary governance graph, in accordance with an embodiment of the present invention.
Figure 14A:
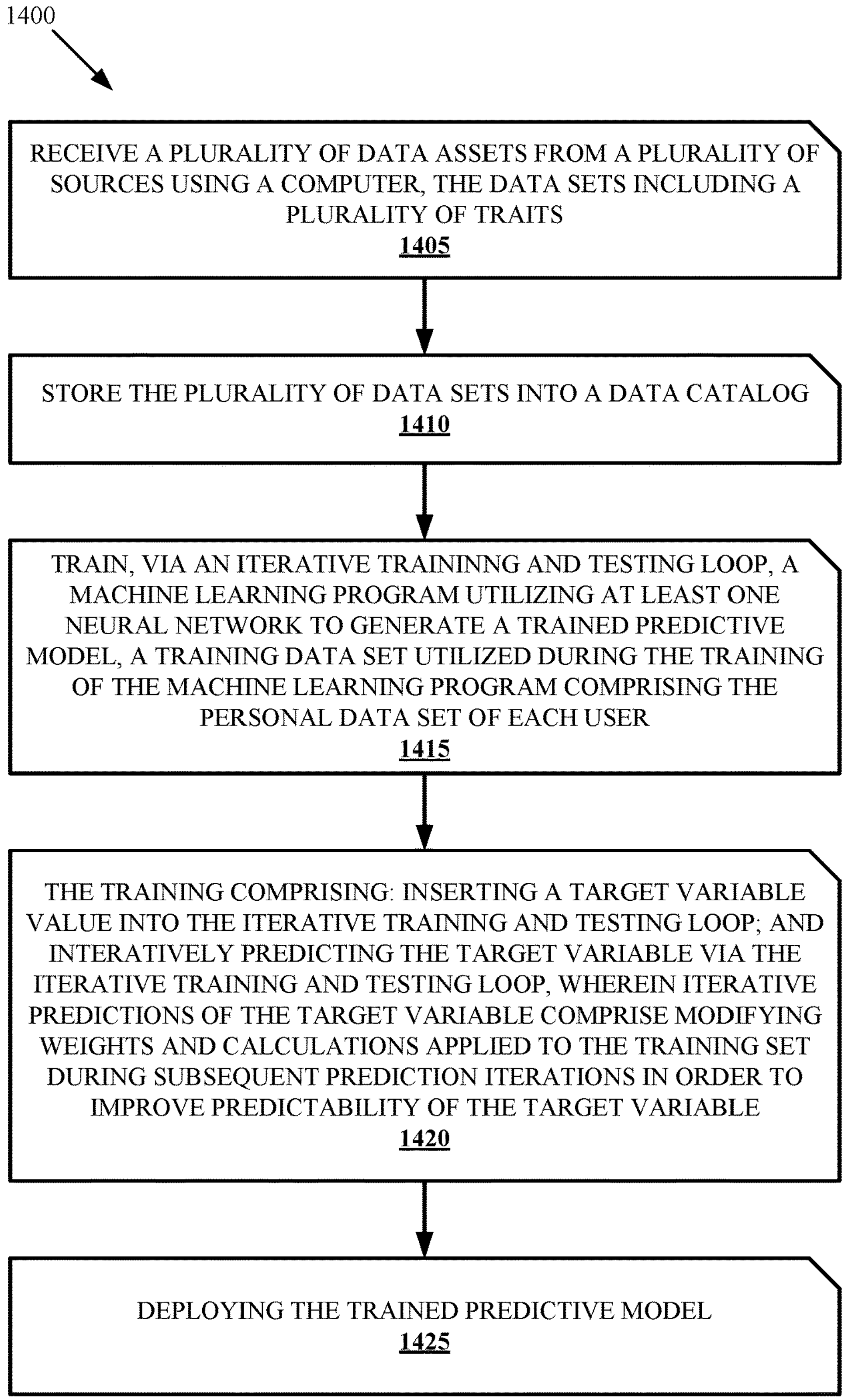
FIGS. 14A-14B depict a block diagram of a method for creating a representation of interconnections between datasets using a machine learning model, in accordance with an embodiment of the present invention.
Figure 14B:
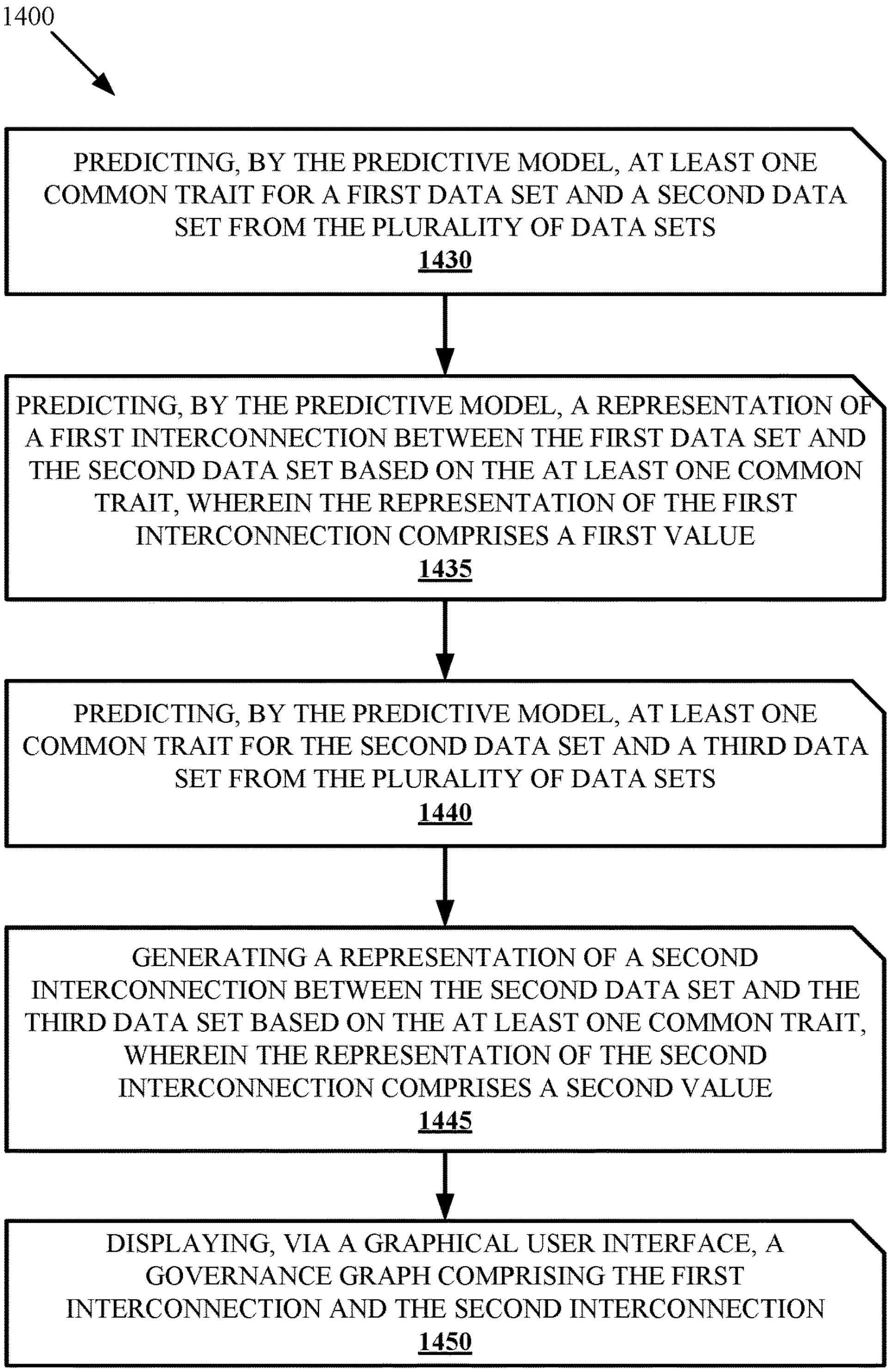

Various governance graphs are envisioned to achieve the goals of the present invention. FIG. 12 depicts and an example governance graph, according to a particular embodiment, where various data sets are shown as nodes and connecting with various lines to other downstream data sets. Similarly, FIG. 13 depicts an alternate example of a governance graph, according to a particular embodiment, showing the various sizes of the nodes 1302, where the nodes represent the various data sets, and the lines or interconnections 1304 between the nodes having varying lengths and weights or thickness.

Particular embodiments of the invention also utilize machine learning and predictive analysis. For example, the system may be used to predict how the data may be used in the future, whether it would even be useful in the future in instances where the data had not been accessed for a predetermined period of time, whether a particular data set is likely to be non-compliant based on the amount of users access the data, or to predict new governance policies or rules that will be necessary based on new regulations received from various sources. To that effect, the system, using a machine learning model, could provide guidance on how the rules could be established such that the data steward or the owner of the data does not have to go in and manually enter such governance policies. Governance policies for a particular entity, for example from a bank, could also be predicted based on other policies already instituted at the entity. For example, where social security numbers are always treated with the highest level of a security, any new system instituted could be taught to apply the same governance rules to any data collected by the new system.

Finally, the system is particularly useful in cutting down on lag-time. For example, in a large company, an employee may have to go to three different departments to ask around to find the answer they are looking for. However, with the governance graph created by displaying the interconnections between the data, a user that normally does not have insight into sales data may be able to easily find the information they are looking for on their own such that they are provided with a full picture of the data within the organization that pertains to the question they are looking to answer.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®," "Windows®," "macOS®," "iOS®," "Android®," and the like may be subject to trademark rights in various jurisdictions throughout the world and are used here only in reference to the products or services properly denominated by the marks to the extent that such trademark rights may exist.

What is claimed is:

1. A computer system for creating user-specific representations of associations between data assets, the computer system comprising:
- at least one processor;
- a communication interface communicatively coupled to the at least one processor; and
- a memory device storing executable code that, when executed, causes the processor to:
  - determine that a first user has accessed, via a first user device, a user profile associated with an entity;
  - receive a plurality of data assets from a plurality of sources, each of the plurality of data assets having one or more characteristics;
  - store the plurality of data assets into a data catalog;
  - compare the one or more data asset characteristics to determine one or more data assets having common characteristics, wherein the one or more common characteristics indicate a connection between the one or more data assets;
  - in response to determining one or more data assets having common characteristics, generate a governance graph depicting the one or more connections between the one or more data assets;
  - display, via a graphical user interface associated with the first user device, the governance graph depicting the one or more connections;
  - determine that a second user has accessed, via a second user device, an executive-level profile associated with the entity;
  - generate an executive-level governance graph depicting one or more factors associated the plurality of data assets; and
  - display, via a graphical user interface associated with the second user device, the executive-level governance graph depicting the one or more factors associated with the plurality of data assets.

2. The system of claim 1, wherein the first user has a first level of security clearance associated with the entity and the second user has a second level of security clearance associated with the entity, wherein the second level of security clearance is higher than the first level of security clearance.

3. The system of claim 1, wherein one or more data asset characteristics comprise at least one of a common field, a common usage, a common source, a common database, a common generating application, and a common pattern of usage.

4. The system of claim 1, wherein the one or more factors associated with the plurality of data assets is at least one of a pattern of usage, a level of risk, and a degree of confidentiality for each of the data assets of the plurality of data assets.

5. The system of claim 4, wherein the one or more factors associated with the plurality of data assets comprises one or more usage patterns for each of the plurality of data assets by a plurality of users.

6. The system of claim 5, wherein the one or more usage patterns of the plurality of data assets includes at least one of compliance with a governance policy associated with the entity and non-compliance with the governance policy associated with the entity.

7. The system of claim 6, wherein the executive-level governance graph depicts the one or more usage patterns as nodes, wherein a first node having a first size depicts a first level of usage and a second node having a second size depicts a second level of usage, wherein the first node is larger than the second node, and wherein the larger node depicts a higher level of usage of a data asset.

8. The system of claim 1, wherein the one or more factors associated with the plurality of data assets comprise one or more relationships between each of the plurality of data assets, and wherein the one or more relationships are depicted as lines.

9. The system of claim 8, wherein a length of each of the lines depicting the one or more relationships between the plurality of data assets indicates the degree of connection between each of the plurality of data assets, wherein a longer line indicates a lesser degree of connection and a shorter line indicates a greater degree of connection between data assets.

10. The system of claim 8, wherein a thickness of each of the lines depicting the one or more relationships between the plurality of data assets indicates the degree of connection between each of the plurality of data assets, wherein a thinner line indicates a lesser degree of connection and a thicker line indicates a greater degree of connection between data assets.

11. The system of claim 1, wherein the executive-level governance graph depicts a lineage of the plurality of data assets, wherein the lineage of the plurality of data assets tracks flows and changes of the plurality of data assets over time.

12. The system of claim 1, wherein the executable code, when executed, further causes the processor to:
- determine that a third user has accessed, via a third user device, a data steward profile associated with an entity;
- receive a second plurality of data assets from the third user;
- store the second plurality of data assets into the data catalog;
- compare the second plurality of data assets to the plurality of data assets to eliminate duplicate data assets;
- generate an updated governance graph based on the plurality of data assets and the second plurality of data assets with the duplicate data assets eliminated.

13. A computer-implemented method for creating user-specific representations of associations between data assets, the method comprising the steps of:
- determining that a first user has accessed, via a first user device, a user profile associated with an entity;
- receiving a plurality of data assets from a plurality of sources, the data assets having one or more characteristics;
- storing the plurality of data assets into a data catalog;
- determining one or more data asset characteristics for each of the plurality of data assets;
- comparing the one or more data asset characteristics to determine one or more data assets having common characteristics, wherein the one or more common characteristics indicate a connection between the one or more data assets;
- in response to determining one or more data assets having common characteristics, generating a governance graph depicting the one or more connections between the between the one or more data assets;

displaying, via a graphical user interface associated with the first user device, the governance graph depicting the one or more connections;

determining that a second user has accessed, via a second user device, an executive-level profile associated with the entity;

generating an executive-level governance graph depicting one or more factors associated the plurality of data assets; and displaying, via a graphical user interface associated with the second user device, the executive-level governance graph depicting the one or more factors associated with the plurality of data assets.

14. The method of claim 13, wherein the one or more factors associated with the plurality of data assets is at least one of a pattern of usage, a level of risk, and a degree of confidentiality for each of the data assets of the plurality of data assets.

15. The method of claim 14, wherein the one or more factors associated with the plurality of data assets comprises one or more usage patterns for each of the plurality of data assets by a plurality of users.

16. The method of claim 15, wherein the one or more usage patterns of the plurality of data assets includes at least one of compliance with a governance policy associated with the entity and non-compliance with the governance policy associated with the entity.

17. The method of claim 13, wherein determining the one or more data assets have common characteristics comprises determining whether the one or more data assets have a common characteristic via at least one of a direct connection and an inferred connection.

18. The method of claim 17, wherein the one or more data assets having a common characteristic via a direct connection comprises a first data asset of the one or more data assets being directly associated with a second data asset of the one or more data assets, wherein the first data asset and the second data asset are directly related based on common metadata fields.

19. The method of claim 18, wherein the one or more data assets having a common characteristic via an inferred connection comprises a second data asset of the one or more data assets being indirectly associated with a third data asset of the one or more data assets, wherein the second data asset and the third data asset are indirectly associated based on the second data asset and the third data asset being commonly used together.

20. A non-transitory computer-readable storage medium, the computer-readable storage medium including instructions that when executed by a processor, cause the processor to:

determine that a first user has accessed, via a first user device, a user profile associated with an entity;

receive a plurality of data assets from a plurality of sources, the data assets having one or more characteristics;

store the plurality of data assets into a data catalog;

determine one or more data asset characteristics for each of the plurality of data assets;

compare the one or more data asset characteristics to determine one or more data assets having common characteristics, wherein the one or more common characteristics indicate a connection between the one or more data assets;

in response to determining one or more data assets having common characteristics, generate a governance graph depicting the one or more connections between the between the one or more data assets;

display, via a graphical user interface associated with the first user device, the governance graph depicting the one or more connections;

determine that a second user has accessed, via a second user device, an executive-level profile associated with the entity;

generate an executive-level governance graph depicting one or more factors associated the plurality of data assets; and display, via a graphical user interface associated with the second user device, the executive-level governance graph depicting the one or more factors associated with the plurality of data assets.

* * * * *